UNITED STATES PATENT OFFICE.

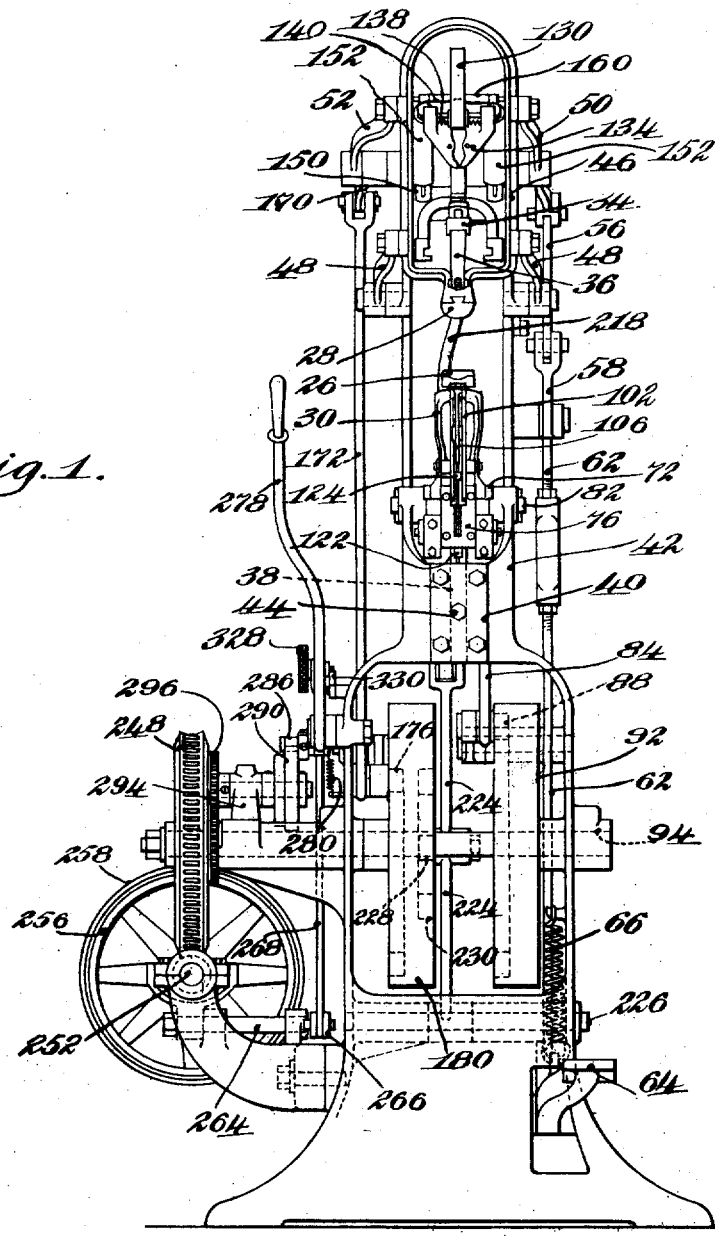

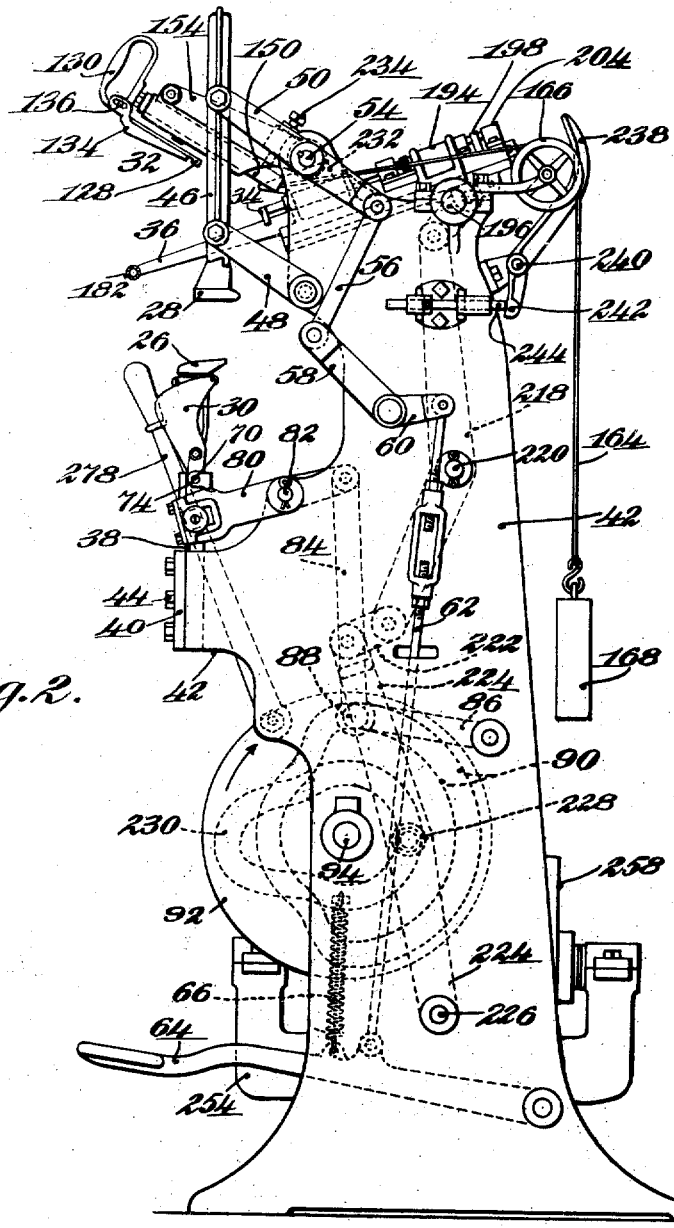

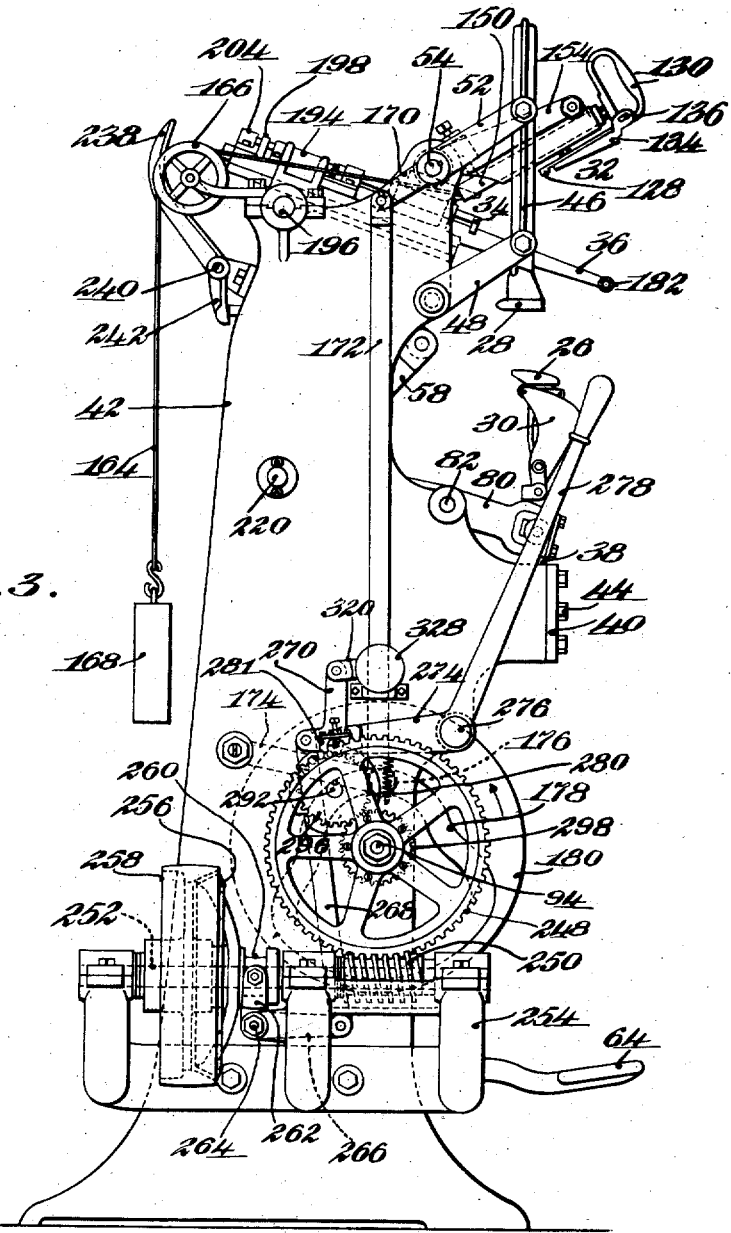

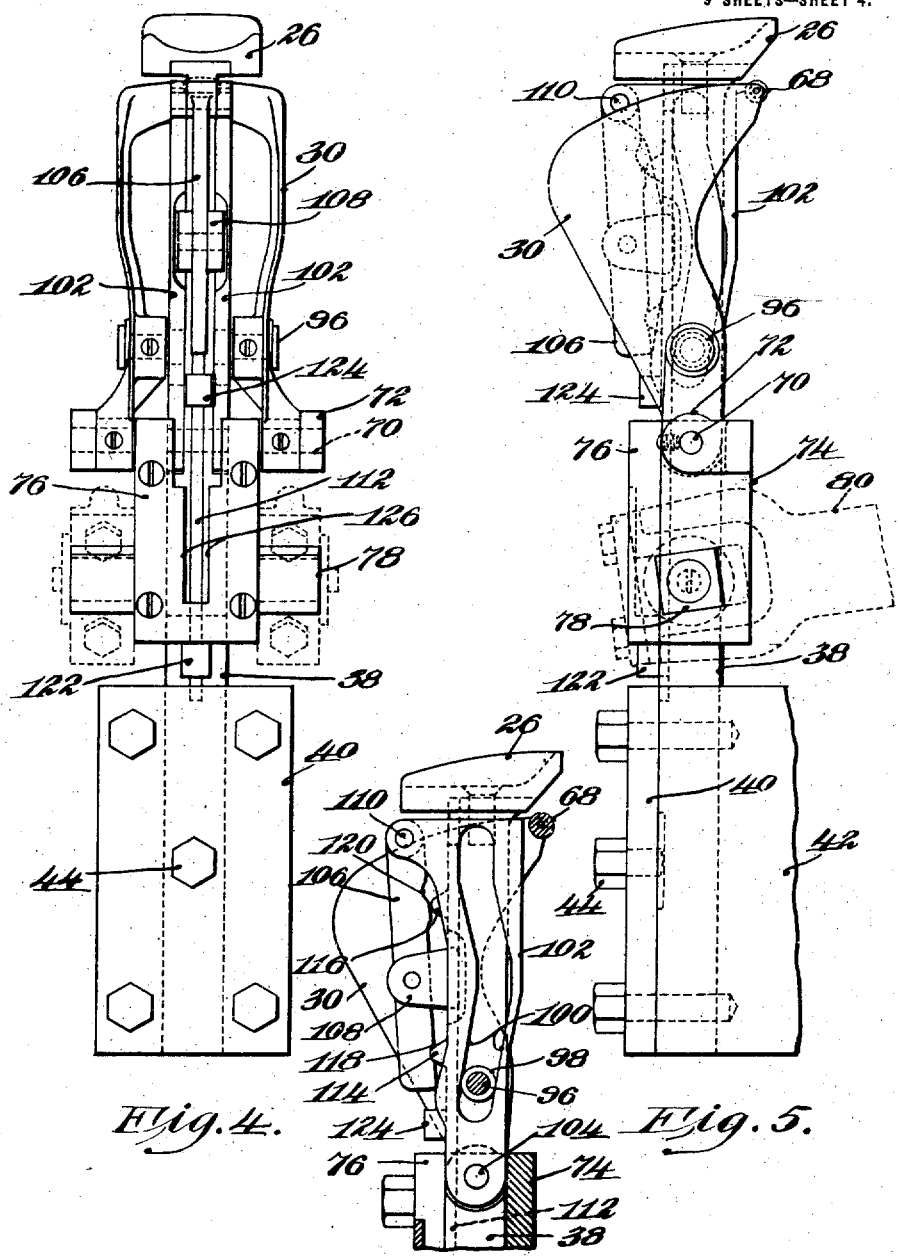

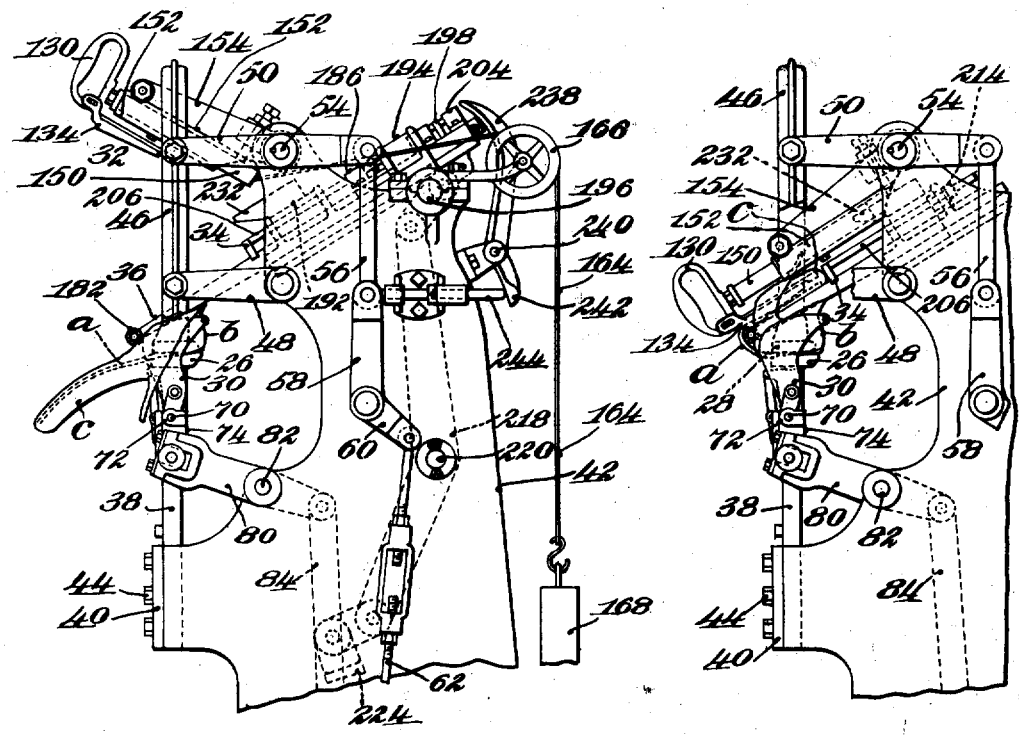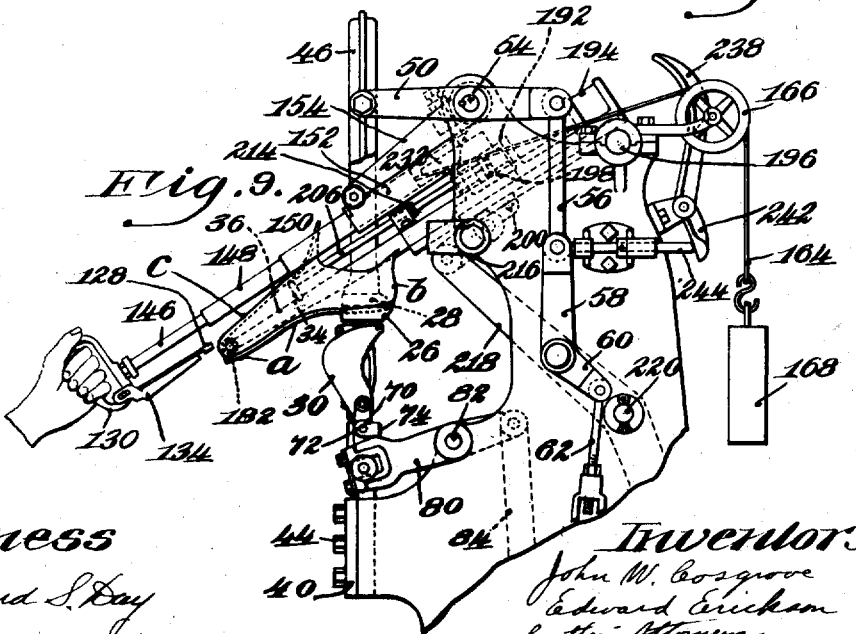

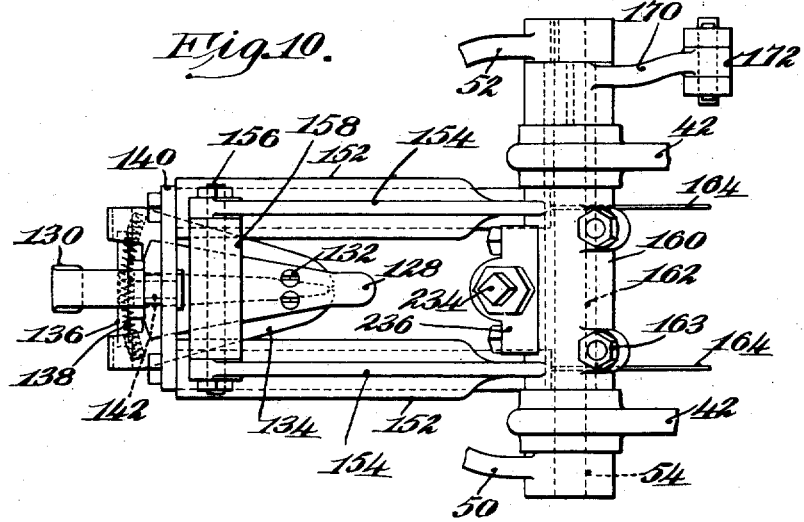
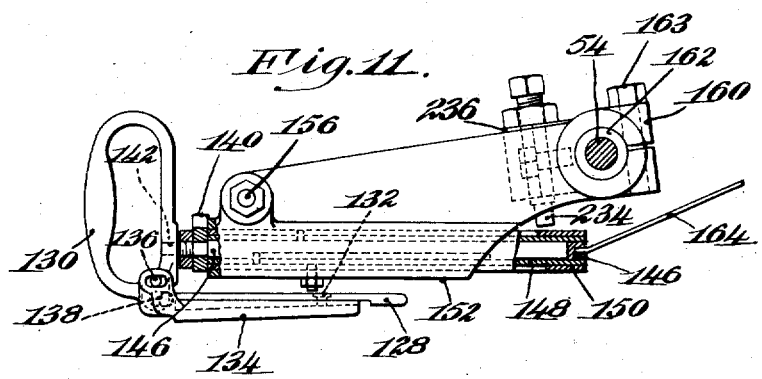
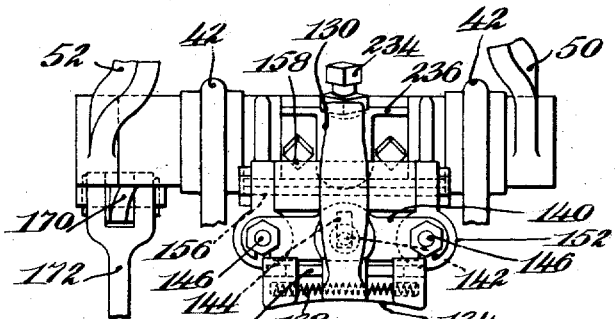

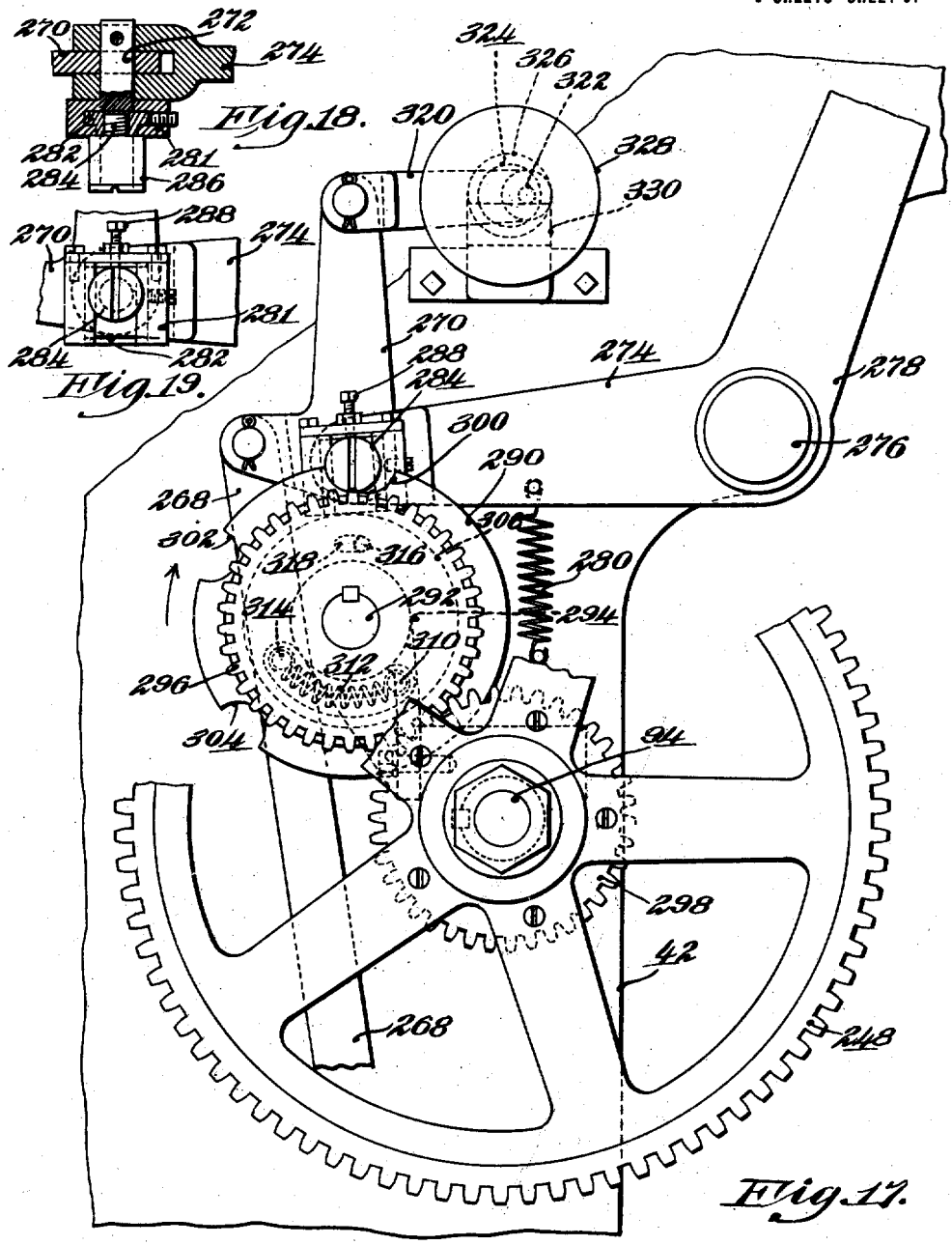

JOHN W. COSGROVE, OF MEDFORD, AND EDWARD ERICKSON, OF BEVERLY, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY.

SHOE-TURNING MACHINE.

1,257,583.      Specification of Letters Patent.      Patented Feb. 26, 1918.

Application filed May 14, 1915. Serial No. 28,011.

*To all whom it may concern:*

Be it known that we, JOHN W. COSGROVE and EDWARD ERICKSON, citizens of the United States, residing, respectively, at Medford, Middlesex county, and Beverly, Essex county, State of Massachusetts, have invented certain new and useful Improvements in Shoe-Turning Machines; and we do hereby declare the following to be a full, clear, and exact description of the invention, such as will enable others skilled in the art to which it appertains to make and use the same.

The present invention relates to turning machines and more particularly to machines for turning lasted shoes right side out after they have been sewed.

The turning operation as applied to lasted shoes requires a considerable amount of manual effort upon the part of the operator, coupled with skill to prevent injury to the upper during the turning operation. When the turning operation is performed mechanically the operator is relieved of the manual effort, but upon the other hand the machine is unable to properly compensate for varying lengths and styles of shoes, and frequently damages the shoe during the turning operation.

The object of the present invention is to produce an improved form of turning machine which performs the turning operation without the necessity of substantial aid by the operator, and which may be operated successfully upon shoes which vary constantly in size and shape.

With this object in view the several features of the invention consist in certain novel features of construction, combinations and arrangements of parts hereinafter described and claimed, the advantages of which will be obvious to those skilled in the art from the following description.

The invention in its most complete embodiment comprises both means for turning the heel part of a shoe, and means for turning the forepart of a shoe, but it will be understood that while these means are preferably used in conjunction to perform all of the operations necessary for completely turning a shoe it will be apparent that either the improved heel turning mechanism or the improved forepart turning mechanism may be employed alone, if so desired.

Figure 13:
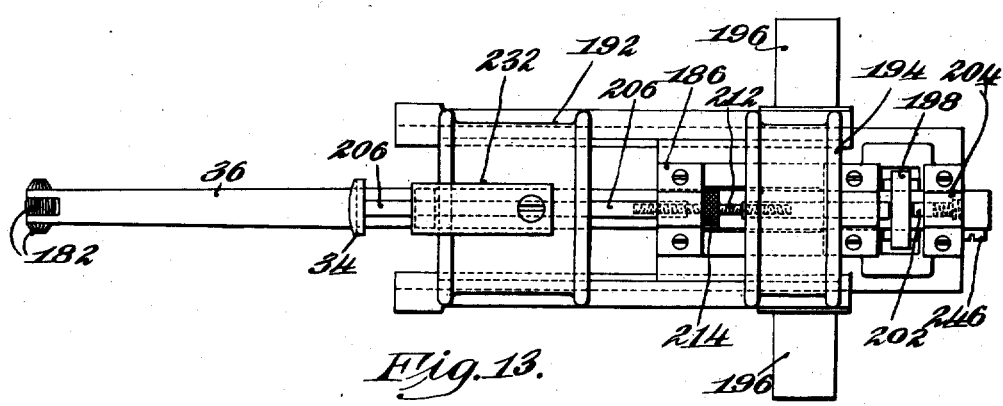
Figure 14:
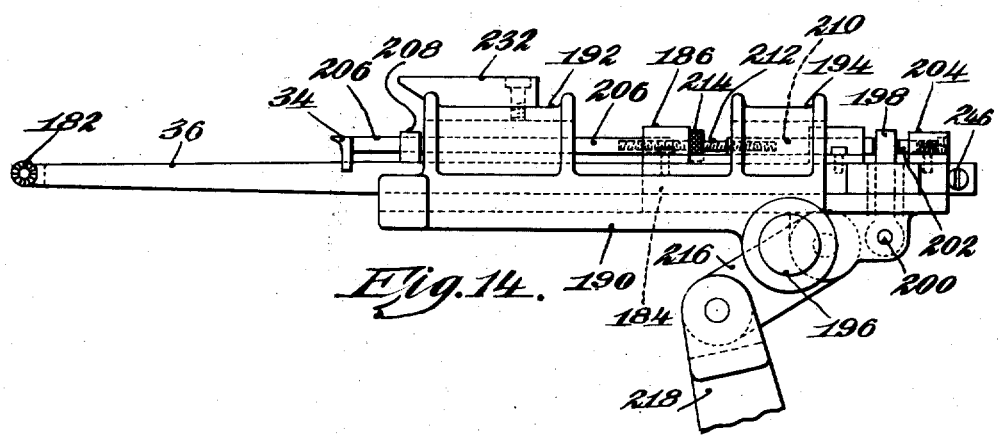
Figure 15:
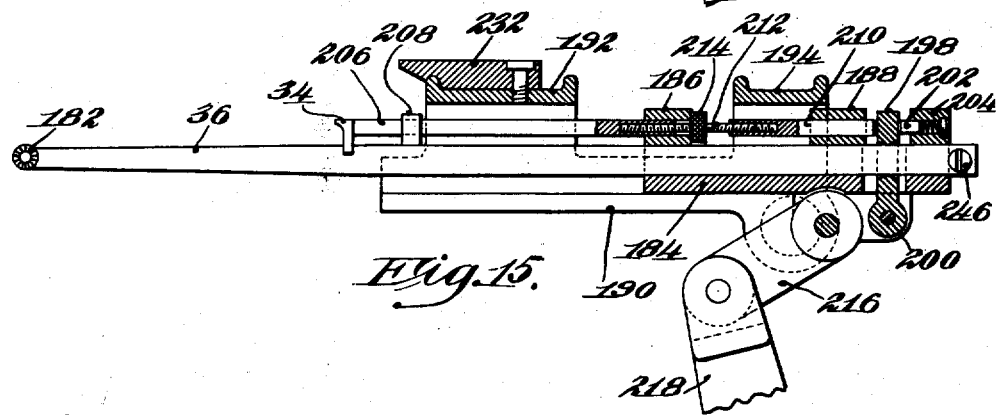
Figure 16:
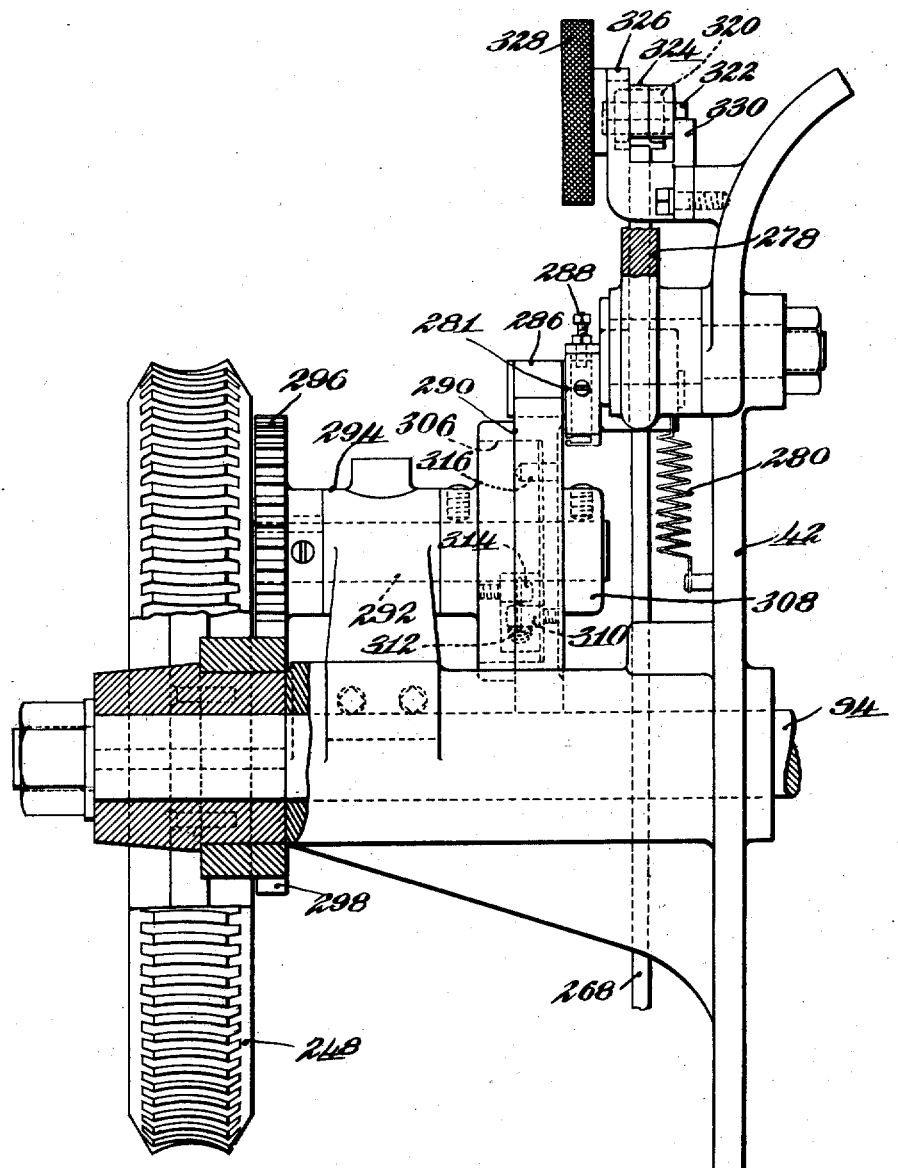

In the accompanying drawings illustrating the preferred form of the invention; Figure 1 is a front elevation of a shoe turning machine embodying the present invention; Figs. 2 and 3 are, respectively, a right-hand side elevation and a left-hand side elevation of the machine; Fig. 4 is a detail showing a front elevation, and Fig. 5 is a detail showing a right-hand side elevation of the heel turning mechanism; Fig. 6 is a detail showing a right-hand side elevation of the same parts with a portion in vertical section; Figs. 7, 8 and 9 are details showing right-hand side elevations of the operative instrumentalities of the machine in different operative positions; Figs. 10 and 11 are details showing, respectively, a plan view and a right-hand side elevation of the forepart form and supporting and actuating mechanism; Fig. 12 is a detail showing a front elevation of the same parts; Figs. 13 and 14 are details showing, respectively, a plan view and a right-hand side elevation of the forepart turning finger, and the means for supporting and actuating it; Fig. 15 is a view similar to Fig. 14 with certain parts shown in section; Fig. 16 is a detail showing a front elevation, partly in vertical section, of the automatic stop mechanism; Fig. 17 is a left-hand side elevation of the stop mechanism; and Figs. 18 and 19 are details showing, respectively, a horizontal section and a side elevation of a detail of the stop mechanism.

In the illustrated embodiment of the invention the shoe is clamped in the machine and the heel and forepart are then turned successively by the turning mechanism. The operative instrumentalities of the machine comprise lower and upper clamp members 26 and 28, as shown in Figs. 2 and 3, a heel form 30 for turning the heel part of the shoe, a forepart form 32 for supporting the forepart while it is being turned, a forepart turning finger 36 for turning the forepart of the shoe, and a forepart gage 34 for automatically regulating the movement of the turning finger.

The lower clamp member 26 is mounted, as shown particularly in Figs. 4, 5 and 6, at the upper end of a square post 38, fixed upon the frame 42 of the machine. In order that it may be adjusted vertically it is arranged in a slideway covered by a plate 40, and fixed in adjusted position by a set screw 44.

The upper clamp member 28 is mounted at the bottom of an open frame or yoke 46. In order that this yoke may be moved vertically it is connected with the frame 42 of the machine, near its lower end, by swinging links 48, while its upper end is connected with lever arms 50 and 52. These arms are keyed to a rock shaft 54 extending through the frame of the machine from side to side. The upper clamp member is raised and lowered by a treadle mechanism under the control of the operator. For this purpose the lever 50 is extended rearwardly and pivoted to a toggle comprising arms 56 and 58, of which the latter is pivoted on the frame of the machine. An arm 60 integral with the arm 58 is connected by an adjustable rod 62 with a treadle lever 64. A spring 66 normally holds the treadle lever in raised position and when the lever is depressed by the operator the toggle is straightened, thus lowering the yoke 46 and bringing the clamp member 28 into coöperative relation with the clamp member 26.

The heel form 30 comprises a U-shaped member embracing the lower clamp and heel cup 26 curved to conform to the general shape of the heel part of the shoe upper. The heel form is provided with an antifriction roller 68 journaled upon the upper portion and arranged to engage with and roll over the shoe upper. The heel form is pivotally supported at its lower end by lugs 72 formed upon a slide 74, the lugs receiving oppositely extending studs 70. The slide is grooved to receive the post 38, which forms a guide member for the slide, and the slide is held in place thereon by a removable front plate 76. At each side of the slide a block 78 is pivoted, and these blocks are embraced by the forked ends of an actuating lever 80. This lever is pivoted at 82 on the frame of the machine, and its rear end is connected to a link 84, which in turn is pivoted, at its lower end, to a distance arm 86. A cam roller 88 is journaled at the pivotal connection between the link and the arm, and travels in a cam path 90 formed in the face of a cam disk 92, which is mounted on a horizontal cam shaft 94 journaled in the frame 42 of the machine. The operation of this cam is to raise and lower the heel form at suitable times in the operation of the machine.

To facilitate the introduction of the heel form in the upper of the shoe before the shoe has been turned, it is necessary to have the roller 68 occupy the position shown in Figs. 5 and 6, in which it is beneath the clamp member 26, and in front of the rear edge of the clamp member. In the operation of turning the shoe upper, however, the roller 68 must swing rearwardly, in order to not only clear the clamp member 26, but to provide sufficient space between these parts for the material of the upper, and finally, in completing the turning operation, it is desirable to swing the roller forwardly as it nears the end of its path of movement. To produce these movements the heel form is pivotally mounted, as above described, and controlled by cam mechanism. For this purpose a stud 96 projects inwardly from each side of the member 30, and carries a cam roll 98 which travels in a cam path 100 formed in one of a pair of cam plates 102. The cam plates rest in recesses formed in the sides of the post 38, and are pivoted to the post on studs 104 at their lower ends. The cam paths 100 are so formed that as the slide 74 rises, carrying with it the heel form 30, the cam rolls 98 are first moved rearwardly, and then forwardly again, so that the roller 68 follows a path which swings rearwardly and then forwardly around the rear extremity of the clamp member 26.

After the heel form has been completely elevated to turn the heel part of the shoe upper, it is desirable to return the form in a path to cause it to clear the shoe upper. For this purpose, the cam plates 102 are pivotally mounted as above described, and means are provided for swinging them forwardly and rearwardly about their pivotal connections. A lever 106 is pivoted between lugs 108 projecting forwardly from the post 38, and the upper end of this lever is connected by a pivot 110 with the cam plates. The post is provided with a slotted front face, and a slide rod 112 moves in the slot and is provided with two projections 114 and 116 which coöperate with the lever 106. This lever has two notches 118 and 120 which coöperate with the projections just described. The slide rod 112 is also provided with two projecting lugs 122 and 124. The plate 76 on the slide 74 is provided with a slot 126 which clears the lug 124 until the slide has nearly reached its uppermost position. During this upward movement the parts have the position of Figs. 4, 5 and 6, in which the slide rod 112 is down, so that the projection 114 is seated in the notch 118 in the lever 106, while the upper end of the lever is held in a forward position by engagement of the projection 116 with the part of the lever immediately below the notch 120. Under these conditions the cam plates 102 are in their forward position, in which the path of movement of the roll 68 will be in close proximity to the clamp member 26. When the slide 74 nearly reaches the upper end of its movement, however, the lower unslotted part of the plate 76 strikes the lug 124 and raises the slide rod 112, thus disengaging the projection 114 from the notch 118 and bringing the projection 116 into engagement with the notch 120, whereby the lever 106 is swung so as to move the cam plates 102 rearwardly, and thus swing the heel form rearwardly so that the roller 68 is disengaged from the shoe upper. During the succeeding descending movement of the slide 74 the path which the roller 68 follows is spaced from the edge of the heel clamp to clear the shoe upper. At the completion of the descending movement of the slide, the lug 122 is engaged by the lower end of the plate 76, restoring the parts to their initial positions.

The construction of the forepart form is shown particularly in Figs. 10, 11 and 12. This form has a central member or body 128 in the shape of a flat plate which is fixed at its rear end to a handle 130. The member 128 is provided with spreader members 134 pivoted upon opposite sides of the body at 132. These side members 134 have upwardly projecting lugs at their rear extremities, which are guided upon a pin 136 projecting laterally from the handle into slots in the lugs. A spring 138 interposed between the rear ends of the side members tends to swing them outwardly to form a yielding wedge shaped member adapted to fit shoe uppers of different sizes. This swinging movement is limited by engagement of the forward extremities of the side members with each other, as shown in Fig. 10. This arrangement of parts adapts the forepart form to fit into and fill shoe uppers of a variety of sizes without any preliminary adjustment of the parts. The handle 130 is supported upon a yoke 140 and is provided with a headed stud 142, which projects loosely through a vertical slot 144 in the yoke 140, this arrangement being such as to permit a substantial degree of play between the handle and the yoke to assist in the introduction of the form into the shoe, as will be hereinafter described. The yoke 140 is fixed to the forward ends of a pair of slide rods 146 which form part of a telescopic arrangement comprising sleeves 148 in which the rods slide, sleeves 150 in which the sleeves 148 slide, and sleeves 152 in which the sleeves 150 slide. The sleeves 152 are integral with two arms 154, and these arms are connected at their forward ends, as shown in Fig. 10, by a bolt 156 and a sleeve 158, while they are integral at their rear ends with a cleft sleeve 160 which embraces a hollow shaft 162 and is clamped thereon by clamp screws 163. The hollow shaft 162 is concentric with the shaft 54 previously described, and it provides for a vertical swinging movement of the arms 154 by which the forepart form may be lowered into or raised out of operative position. The object of the telescopic arrangement above described is to permit forward and rearward movements of the forepart form such as are necessary in introducing the form to the upper before it has been turned, and in permitting the form to follow the movement of the shoe upper as it is turned. The relative sliding movements of the rods and sleeves are limited by pins and slots, as shown in Fig. 11. In order that the forepart form may be drawn yieldingly in a rearward direction, cords 164 are fixed to the rear ends of the rods 146, and these cords pass over rollers 166 at the rear of the machine, and are attached to weights 168. The operator may easily draw the forepart form forward, however, by grasping the handle 130, and the weights are only sufficient to maintain the forepart form in firm engagement with the shoe during the turning operation. To raise and lower the arms 154 and the forepart form at suitable times in the operation of the machine, mechanism shown particularly in Figs. 3 and 10 is employed. At the left hand end of the hollow shaft 162 an arm 170 is keyed, and this arm is connected by a rod 172 with a distance arm 174 pivoted on the frame of the machine. A cam roller 176 is journaled at the pivotal connection between the rod and the arm, and this roller works in a cam path 178 formed in the left hand face of a cam disk 180 fixed on the cam shaft 94. With this construction, positive up and down movements are imparted to the arms 154 and to the forepart form for the purpose hereinafter described.

The forepart turning finger 36 performs an operation analogous to that of the "turning post" employed when a shoe is turned by hand, and it is provided at its operative end, as is common in such devices, with anti-friction rollers 182 for engagement with the bend in the shoe sole. The means for supporting and actuating the turning finger are shown particularly in Figs. 2, 13, 14 and 15. The rear part of the finger is in the form of a square rod slidingly mounted in a longitudinal guideway in a slide 184. The finger is retained in the guideway by means of three bearing blocks 186, 188 and 204, fastened to the upper surface of the slide.

The slide 184 moves in guideways in a carrier 190 comprising two parallel arms which form guideways for the slide, these arms being connected above by integral yokes 192 and 194 beneath which the slide 184 can move. The carrier is provided near its rear end with oppositely projecting trunnions 196 which are journaled in bearings at the upper end of the frame 42 of the machine, as shown in Fig. 2. This arrangement permits the carrier to be rocked vertically for a purpose hereinafter described. The slide 184 is moved in the carrier in a forward and rearward direction, for the purpose of actuating the forepart gage 34 and the turning finger 36. The forepart gage determines the extent of the advancing movement of the finger in order to automatically govern the movement of the finger to accord with different lengths of foreparts. To provide for an operative connection between the slide and the turning finger a friction dog 198 is employed, this dog being pivoted at its lower end by means of a pin 200 to ears depending from the slide, and being perforated to embrace the shank of the turning finger. When this friction dog is swung rearwardly it may grip the turning finger and cause the finger to move forwardly with the slide. Normally, however, the friction dog is swung forwardly by a spring pressed plunger 202 which is mounted in the bearing block 204 and in its forward position the friction dog permits the turning finger to slide freely through it. The friction dog is thrown into operation by the action of the forepart gage 34 which is supported and moved until the gage contacts with the toe portion of a shoe which has been bent back about the turning iron 36. The forward movement of the gage is then momentarily arrested and the continued movement of the slide causes a relative rearward movement of the gage to move the friction dog into an operative position. The gage is mounted on a rod 206 which is slidingly supported near its forward end in a lug 208 projecting upwardly from the turning finger 36. The rear end of the rod 206 slides in a perforation in the bearing block 186. A second slide rod 210 moves through a perforation in the bearing block 188, and is connected adjustably with the rod 206 by a right and left hand screw 212. This screw is provided with a knurled collar 214 by which it may be turned, and which also constitutes a stop to arrest forward movement of the slide rods by engagement with the bearing block 186. When the movement of the forepart gage is arrested, as above described, during the forward movement of the slide 184, the rods 206 and 210 are moved rearwardly with respect to the slide, thus swinging the friction dog rearwardly and causing it to clamp the forepart finger to the slide and thereafter the finger participates in the forward movement of the slide.

The slide 184 is moved by cam mechanism in timed coöperation with the other parts of the machine. For this purpose a link 216 is pivoted to the bottom of the slide and to the upper end of a lever 218. This lever is journaled at 220 on the frame of the machine, and the lower end of the lever 218 is connected by a link 222 with a cam lever 224. The cam lever is pivoted at its lower end at 226, and is provided with a cam roller 228 working in a cam path 230 formed in the right hand face of the cam disk 180. With this construction, positive forward and rearward movements are imparted to the slide 184 which do not interfere substantially with the pivotal movements of the slide carrier, owing to the fact that these movements occur when the link 216 is in its rearmost position, as shown in Fig. 15.

The upward swinging movements of the slide carrier 190 are caused by engagement of the turning finger 36 with the lower end of the clamp yoke 46. When this yoke is raised, as in Figs. 1, 2 and 3, the finger is raised with it so as to be out of the way when the operator places the shoe on the lower clamp member 26. When the upper clamp member is lowered into operative position, however, the turning finger descends with it into the operative position shown in Figs. 7, 8 and 9. To insure the full descent of the turning finger to this operative position, and to hold it down when it is in operation, a screw 234 is mounted in a lug 236 fixed on the sleeve 160 of the arms 154 by which the forepart form is supported. When these arms swing downwardly the screw 234 is brought into engagement with a block 232 fixed on the yoke 192 of the carrier 190, thus holding the carrier in its depressed position so long as the forepart form is in operative position.

After the shoe has been clamped, and the heel part has been turned, the forepart of the shoe must be swung upwardly and rearwardly so as to double the sole over the forward end of the turning finger 36, the finger at this time being in its rearmost position. Since the finger is not at this time clamped to the slide 184, means are provided for preventing it from sliding rearwardly. For this purpose an arm 238 is mounted on a rock shaft 240 journaled at the rear of the frame of the machine with the upper end of the arm 238 in position to be engaged by the shank of the turning finger. A second arm 242 fixed to the rock shaft coöperates with the rod 244 which slides horizontally in bearings at the side of the frame, and the forward end of the rod 244 is arranged to be engaged by the toggle having arms 56 and 58 when the latter is straightened in the operation of clamping the work, as shown in Fig. 7. By these means the arm 238 is swung forwardly into operative position and held there while the clamp is in action, but when the clamp is opened for the removal of the work the arm 238 is free to swing rearwardly, so that the operator may thrust the turning finger as far to the rear as may be necessary for the convenient removal of the shoe from the clamp.

The power mechanism by which the machine is driven will now be described. The cam shaft 94 is provided, at its left hand end, with a worm wheel 248 which meshes with a worm 250 fixed on a power shaft 252. This power shaft is journaled in brackets 254 forming part of the frame of the machine. A conical friction clutch member 256 is mounted on the shaft 252, being slidable thereon but keyed to the shaft so as to rotate therewith. The clutch member 256 coöperates with a clutch surface formed on a pulley 258 which turns loosely on the shaft, and this pulley may be belted to any suitable source of power. To throw the clutch into and out of operation the clutch member 256 is provided with a grooved collar 260 with which a forked lever arm 262 coöperates. This lever arm is fixed on a rock shaft 264 which is provided also with a forwardly projecting arm 266. A link 268 connects the arm 266 with a bell crank lever 270, as shown particularly in Figs. 16 and 17, and this lever is pivotally mounted on a lever arm 274 pivoted on a stud 276 on the frame of the machine. A hand lever 278, integral with the arm 274, extends upwardly at the front of the machine within convenient reach of the operator. When the hand lever 278 is swung forwardly the clutch members are engaged and the cam shaft is rotated, and when the hand lever is released a spring 280, connected with the arm 274, returns the parts to inoperative position. In the normal operation of the machine it is desirable to relieve the operator from the necessity of controlling the clutch constantly through the hand lever 278, and accordingly automatic means are provided which hold the clutch in operation during predetermined portions of the cycle of operations of the machine, and then automatically disconnect the clutch and stop the machine at the completion of certain stages in the shoe turning operation. For this purpose the stud 272 which connects the bell crank lever 270 with the arm 274 is connected integrally, as shown in Fig. 18, with a slideway 281 having a T-slot in which a slide block 282 is mounted. This slide block is provided with a stud 284 upon which a cam roller 286 is journaled. An adjusting screw 288 mounted on the slideway 281 retains the slide block in adjusted position in the slideway. The roller 286 coöperates with the periphery of a cam disk 290 mounted on a shaft 292 which is journaled in a bearing 294 on the frame of the machine. A gear 296 fixed on the outer end of the shaft 292, is driven by a gear 298 fixed to the worm gear 248.

The cam disk normally retains the clutch in operative engagement, but is provided with three depressions 300, 302 and 304, respectively, and when the roll encounters and falls into one of these depressions the clutch is disconnected and the machine is stopped. Since a sudden stoppage would involve a severe strain on the mechanism, particularly the cam roller 286 and the parts which support it, the cam disk 290 is not fixed rigidly on the shaft 292, but is mounted loosely between a second disk 306 and a collar 308 which are fixed on the shaft. The cam disk is provided with a pin 310 which is connected by a coiled spring 312, with a pin 314 on the disk 306, these pins and the spring working in a recess formed in the inner face of the disk 306, as shown in dotted lines in Figs. 16 and 17. Relative movement of the two disks is limited by a pin 316 projecting from the disk 290 into a slot 318 in the disk 306. When the cam roller engages one of the recesses in the cam disk 290 the spring 312 yields and permits a slight continued rotation of the shaft 292, until the parts have been brought to rest by friction and by the action of the spring 312.

While it is usually desirable to have the operation of the machine controlled by the cam disk 290, it may sometimes be desirable to have the machine wholly under manual control, particularly where the work to be performed is of a difficult character in which injury to the shoe is likely to occur unless the turning operation is performed carefully under the supervision of the operator. The bell crank lever 270 is connected at its upper end with a link 320 having its opposite end pivoted on a pin 322. This pin projects eccentrically from a cylindrical shank 324, which turns in a lug 326 on the frame of the machine, and is provided with a knurled hand wheel 328 by which it may be turned. A half rotation of the hand wheel and the shank causes the pin 322 to be swung forwardly or rearwardly, this movement being limited by engagement of the pin with a stop lug 330, as shown in Fig. 17. When the parts are in the position of Fig. 17 the automatic stop mechanism is operative, but when the pin 322 is swung to its rearward position the bell crank lever 270 is rocked on the arm 274 to a position such that even when the cam roller 286 is riding on the circular periphery of the cam plate 290 the link 268 is not raised high enough to throw the clutch into operation. In this position of the parts, accordingly, the clutch must be controlled wholly through manipulation of the hand lever 278.

The operation of the machine as a whole will now be described. With the parts in the position of Fig. 2, the operator places a shoe in position between the clamp members 26 and 28. At this time the shoe is inside out, and it is placed so that the heel part of the sole rests upon the clamp member 26 with the heel part of the upper depending around this clamp member and around the heel form. The operator then depresses the treadle 64, thus bringing the clamp member 28 forcibly down upon the sole, and at the same time lowering the turning finger 36 into operative position, as shown for example, in Fig. 7. The operator then pulls the hand lever 278 forwardly, thus disengaging the roller 286 from the depression 300 in the cam disk 290, whereupon the power mechanism starts the rotation of the cam shaft. This rotation continues for somewhat less than a quarter of a turn of the cam shaft, with the result that the heel form is raised to the position of Fig. 7, thus turning the heel part of the shoe upper, and the machine then comes to rest, owing to the engagement of the cam roller 286 with the depression 302 in the cam disk 290. This enables the operator to ascertain if the heel turning operation has been properly completed, and to bend the forepart of the shoe upwardly and rearwardly so as to double the sole around the end of the turning finger 36, as shown in Fig. 8. Holding the upper in this position the hand lever 278 is again actuated whereupon a further partial rotation of the cam shaft occurs, which is arrested by engagement of the cam roller 286 with the third depression 304 in the cam disk 290. This further partial rotation causes the arms 154 to be swung downwardly into the position of Fig. 8, thus bringing the forepart form 32 into alinement with the doubled back forepart of the shoe. The operator grasps the handle 130 and pulls the forepart form forward, so that its end may be introduced into the forepart, and he then thrusts it rearwardly, assisted by the weights 168, so as to cause it to fully enter and distend the forepart. The machine is then in the position shown in Fig. 8. The operator again pulls the hand lever 278 and the rotation of the cam shaft is then completed. During the first part of this rotation the slide 184 (Fig. 15) is advanced in the carrier 190, carrying the forepart gage 34 with it, while the turning finger 36 remains for the moment stationary. As soon as the movement of the gage is arrested by contact with the extremity of the toe, as shown in Fig. 8, however, the turning finger is clamped in the slide 184 and then moved forwardly with it, thus subjecting the sole of the shoe to a progressive bending operation whereby the forepart is turned. During this bending operation the forepart form holds the forepart close to the turning finger and retains it against any transverse movement, but the forepart is gradually stripped from the form and the parts reach the position shown in Fig. 9, the heel part form having in the meantime descended. During the last part of the movement of the cam shaft the arms 154 are swung upwardly, thus raising the forepart form to inoperative position, and the machine then comes to rest. The operator thereupon releases the treadle, thus permitting the upper clamp member to rise so that the turned shoe may be removed and replaced by another shoe.

It will be apparent that the construction and operation of this machine are such as to greatly facilitate the work of the operator while relieving him of the necessity of exerting any strength in the performance of the turning operation. In the majority of shoes the operation may be entirely automatic after the shoe has been introduced between the clamp members, except for the bending back of the forepart and the introduction of the forepart form, but in the case of difficult work, where a certain amount of manipulation is necessary to avoid injury to the upper, this may be very conveniently performed, owing to the arrangement by which the machine is automatically stopped at suitable points in a cycle of operations. Where the work is so difficult that it is not safe to subject the forepart to a continuous and automatic turning operation, the operator may, as above described, control the forepart turning operation by manipulation of the hand lever 278, thus graduating the force applied to the upper as may be necessary, and in the meantime, if necessary, assisting the turning operation by manipulation of the shoe. The automatic operation of the forepart gage permits the machine to completely turn the forepart of any shoe which may be placed in the machine, regardless of the length of the forepart, while insuring that the forward movement of the turning finger shall cease at the moment when the turning operation has been completed, so that the shoe is not subjected to any undue strain.

Both the heel turning mechanism and the forepart turning mechanism are employed in connection with shoes which are sewed around the heel part, but in the case of shoes which are sewed only around the shank and forepart the heel turning mechanism becomes unnecessary, and may be removed from the machine or disconnected from the actuating mechanism. In the case of shoes of this kind the heel part is turned by hand, and this may be done either before or after the forepart of the shoe has been turned by the operation of the machine.

It has been proposed heretofore to turn the forepart of a shoe upper by means of a power actuated machine provided with means for clamping the heel part of the shoe, and a turning finger for subjecting the sole to a progressive bending action. In such prior machines, however, the forepart has been held in its doubled back position either by the operator or by means engaging the forepart from the outside. By the use of a forepart form for holding the upper in position during the turning operation, it has been found that the turning operation is rendered more certain, and may be performed with less danger of injury to the shoe upper.

This invention is not limited to the embodiment thereof hereinbefore described and illustrated in the accompanying drawings, but it may be embodied in various other forms within the nature of the invention as it is defined in the following claims.

What is claimed is:—

1. A shoe turning machine, having in combination, means for holding the heel of a shoe, turning means for turning the forepart of the shoe by a bending operation progressing away from the heel, mechanism for moving one of said means away from the other, a forepart form for insertion within the shoe upper, and means for supporting the form in a position to hold the forepart bent back over the turning means during the turning operation.

2. A shoe turning machine, having in combination, means for holding the heel of a shoe, turning means for turning the forepart of the shoe by a bending operation progressing away from the heel, mechanism for moving one of said means away from the other, a forepart form, and means for supporting the form in a position to hold the forepart bent back over the turning means during the turning operation said means being yieldable in the direction of progress of the bending operation.

3. A shoe turning machine, having in combination, means for holding the heel of a shoe, turning means for turning the forepart of the shoe by a bending operation progressing away from the heel, mechanism for moving one of said means away from the other, a forepart form, and means for supporting the form in a position to hold the forepart bent back over the turning means during the turning operation and for moving the form away from, and holding it out of, operative position between successive turning operations.

4. A shoe turning machine, having in combination, means for clamping the heel part of the sole of a shoe in substantially horizontal position with the forepart of the shoe projecting forwardly therefrom, a turning finger movable in a downwardly and forwardly inclined path above the clamping means, and means for holding the forepart bent backwardly and upwardly over the turning finger.

5. A shoe turning machine, having in combination, means for holding the heel of a shoe with the forepart projecting toward the front of the machine, a turning finger movable forwardly, a rearwardly directed forepart form projecting within the upper during the turning operation, and means for supporting the form in a position parallel with the path of movement of the turning finger and for permitting the form to yield in a rearward direction.

6. A shoe turning machine, having in combination, a turning finger about which the sole is bent, clamping members engaging with the heel part of the sole of a shoe at one side of the turning finger, means engaging with the shoe upon the opposite side of the turning finger, means for supporting the turning finger to move in a path lying close to the clamping members and arranged to permit the turning finger to be swung away from the path of movement to facilitate the introduction of a shoe between the clamping members, and power actuated mechanism for operating the turning finger to turn a shoe.

7. A shoe turning machine, having in combination, a pair of clamping members between which the heel part of the sole of a shoe may be clamped, a turning finger and a forepart form operative in positions adjacent the clamping members, and means for supporting and actuating the turning finger and the forepart form constructed and arranged to hold these parts out of their operative positions while a shoe is introduced to the clamping members and thereafter to bring successively the turning finger and the forepart form into operative position.

8. A shoe turning machine, having in combination, upper and lower clamping members, a yoke supporting the upper clamping member, means for raising and lowering the yoke to operate the clamping member, a turning finger having a longitudinal operative movement through the yoke, a guideway for supporting the turning finger pivotally mounted so that the turning finger may be swung upwardly by the yoke when the yoke is raised, a forepart form supported within the yoke, and power actuated means for moving the turning finger in a lengthwise direction to turn a shoe.

9. A shoe turning machine, having in combination, means for holding the heel of a shoe, means for turning the forepart of the shoe by a bending operation progressing away from the heel, mechanism for moving one of said means from the other, and means for gaging the forepart and automatically regulating the length of said movement in accordance with the length of the forepart.

10. A shoe turning machine, having in combination, means for holding the heel of a shoe, a turning finger, means for advancing the finger in the direction of its length, means for holding the forepart of the shoe with the sole doubled back over the finger, a gage, means for moving the gage into engagement with the doubled back end of the forepart prior to the operative movement of the finger, and connections between the gage and the finger actuating means for regulating the operation of the latter in accordance with the length of the forepart.

11. A shoe turning machine, having in combination, means for holding the heel of a shoe, a turning finger, means for holding the forepart of the shoe with the sole doubled back over the finger, an actuating slide, a gage carried by the slide and movable thereby into engagement with the doubled back end of the forepart, and a clamp carried by the slide and adapted to connect the slide with the finger to cause actuation of the finger, said clamp being controlled by the gage and thrown into operation thereby when the advancing movement of the gage is arrested by the toe of the shoe.

12. A shoe turning machine, having in combination, turning members comprising a heel form and a sole support, means for moving one of said members with respect to the other in a general direction to bring the sole support within the form and thus turn the heel part of the shoe, and means including a cam and a cam follower for moving one member transversely with respect to the general direction aforesaid during the turning operation.

13. A shoe turning machine, having in combination, turning members comprising a heel form and a sole support, means for moving one of said members with respect to the other in a general direction to bring the sole support within the form and thus turn the heel part of the shoe, and means for moving one member at the completion of the turning operation away from the other in a direction transverse to the general direction aforesaid to hold the heel form clear of the shoe during the return movement of the parts.

14. A shoe turning machine, having in combination, a heel form, a coöperating sole support, and means for moving the heel form in a general direction with respect to the sole support to turn the heel part of the shoe and in a path swinging outwardly and then inwardly with respect to the sole support and for returning the heel form to its original position through a path more remote from the sole support.

15. A shoe turning machine, having in combination, shoe turning instrumentalities for subjecting a shoe to a series of operations by which it is turned, power mechanism for actuating said instrumentalities, manually operable means for throwing the power mechanism into operation, and stop mechanism for arresting the operation automatically at a predetermined intermediate point in the cycle of operations of the machine.

16. A shoe turning machine, having in combination, shoe turning instrumentalities for subjecting a shoe to a series of operations by which it is turned, power mechanism for actuating said instrumentalities, manually operable means for throwing the power mechanism into operation, stop mechanism for arresting the operation automatically at a predetermined intermediate point in the cycle of operations of the machine, and means for throwing the stop mechanism out of operative condition so as to leave the machine under the sole control of the manually operable means.

17. A shoe turning machine, having in combination, shoe turning instrumentalities constructed and arranged to turn successively the heel part and the forepart of a shoe, power mechanism for actuating said instrumentalities, constructed and arranged to stop automatically at the completion of the heel turning operation and of the forepart turning operation, and manually operable means for throwing the power mechanism into operation after it has so stopped.

18. A shoe turning machine, having in combination, means for holding the heel of a shoe, a turning finger about which the shoe is bent, a forepart form arranged to be inserted inside of the shoe upper to maintain the upper distended during the turning operation, and mechanism for relatively moving the turning finger and the heel holding means.

19. A shoe turning machine, having in combination, means for holding the heel of a shoe, a turning finger about which the shoe is bent, means for relatively moving the turning finger and heel holding means to turn the shoe about the turning finger, and a forepart form arranged to be inserted within the upper during the turning operation and movable in the direction of the turning operation.

20. A shoe turning machine, having in combination, a turning finger about which the shoe is bent, a forepart form arranged to be inserted within the upper of a shoe to maintain the upper distended during the turning operation, and means engaging with the shoe for causing the shoe to be drawn over the turning finger to turn the shoe by an operation progressing toward the toe.

21. A shoe turning machine, having in combination, means for holding the heel of a shoe, a turning member about which the shoe is bent, a toe engaging member, a forepart form arranged to be inserted within the upper after the shoe is bent about the turning member, and mechanism for first actuating the toe engaging member until it engages with the tip of the toe and for thereafter actuating both members to turn the shoe.

22. A shoe turning machine comprising means for holding the heel of a shoe, a turning finger about which the shoe is bent having provision for a bodily movement away from the heel holding means to permit the convenient insertion of the shoe, mechanism for actuating the finger to turn the shoe, and means for determining the initial position of the finger when in proximity to the heel holding means arranged to permit the finger to be retracted when the finger is removed from the heel holding means.

23. A shoe turning machine comprising coöperating heel clamping members, mechanism for actuating the member, a shoe turning finger movable away from the heel clamping members to permit the convenient insertion of a shoe, mechanism for actuating the turning finger to turn the shoe, and means controlled by the heel clamping mechanism for determining the lengthwise position of the turning finger when in proximity to the clamping members.

24. A shoe turning machine comprising coöperating heel clamping members, a turning finger, mechanism for actuating the turning finger, a forepart form arranged to be inserted within the upper of a shoe, and mechanism for moving the forepart form toward and from the shoe while the shoe is held by the clamping members.

25. A shoe turning machine comprising a turning finger, mechanism for actuating the turning finger, a forepart form arranged to be inserted within the upper of a shoe and having a handle, a pair of coöperating spreader members tapering outwardly from the front to the rear of the forepart form, an upwardly projecting slotted lug at the rear end of each member, a pin projecting laterally from the handle and received in the slots in the lugs, and means for yieldingly separating the spreader members.

26. A shoe turning machine comprising a turning finger, mechanism for actuating the turning finger, and a forepart form arranged to be inserted within the shoe upper and having a body portion and a pair of spreader members pivoted upon opposite sides of the body portion and yieldingly retained at their rear ends in a separated position determined by engagement of the forward extremities of the members to distend the upper of a shoe.

27. A shoe turning machine, having in combination, means for holding the heel of a shoe, a turning finger about which the shoe is bent, a forepart gage, mechanism for actuating the gage in the direction of the length of the shoe, and means for locking the gage in the turning finger when the movement of the gage is temporarily arrested by the toe of the shoe.

28. A shoe turning machine, having in combination, coöperating turning members for engaging and turning the forepart of a shoe, mechanism for actuating the members, and means governed by the length of the shoe for automatically controlling the extent of relative movement of the turning members.

29. A shoe turning machine, having in combination, turning members comprising a heel form and a sole support, mechanism for relatively moving the heel form and sole support to turn the heel portion of a shoe, a cam plate having a cam path therein for controlling the direction of movement of the heel form, and mechanism for retaining the cam plate in different positions during the advancing and retracting movements of the form to cause these movements to take place in different paths.

30. A shoe turning machine comprising a sole support, a heel form, mechanism for actuating the heel form to turn the heel portion of a shoe, a cam plate having a cam path therein for controlling the direction of movement of the heel form, and mechanism for retaining the cam plate in one position when the heel form is depressed and for moving the cam plate into and retaining it in another position when the heel form is moved to an elevated position.

31. A shoe turning machine, having in combination, coöperating lower and upper sole clamping members, treadle operated mechanism for moving the clamping members together, a heel turning form, a forepart turning finger, and power actuated mechanism for operating the heel turning form and forepart turning finger to turn the shoe while held between the clamping members.

32. A shoe turning machine, having in combination, coöperating clamping members, mechanism under control of the operator for actuating the clamping members, a forepart turning finger, a forepart form, and power actuated mechanism for first moving the forepart form into alinement with the turning finger and for next actuating the turning finger to turn the forepart of the shoe.

33. A shoe turning machine, having in combination, coöperating clamping members, a forepart turning finger, mechanism operated by the movement of the clamping members toward one another to locate the turning finger in a predetermined position, a forepart form, and mechanism for actuating the turning finger to turn the forepart of the shoe.

34. A shoe turning machine, having in combination, shoe clamping members, mechanism for automatically turning the heel of the shoe and stopping the machine at the completion of the heel turning operation, and mechanism including a forepart form and turning finger for automatically turning the forepart of the shoe and stopping the machine at the completion of the forepart turning operation.

35. A shoe turning machine, having in combination, a turning finger about which the sole of the shoe is bent, and a forepart form projecting within the upper of the shoe to maintain the upper distended and yielding during the turning operation in the direction in which the turning operation progresses.

36. A shoe turning machine, having in combination, means for holding the heel portion of a shoe, a turning finger, mechanism for relatively moving the turning finger and heel holding means to turn the shoe, and a forepart form projecting within the shoe upper to maintain the upper distended and yielding during the turning operation.

JOHN W. COSGROVE.
EDWARD ERICKSON.

Copies of this patent may be obtained for five cents each, by addressing the "Commissioner of Patents, Washington, D. C."

It is hereby certified that in Letters Patent No. 1,257,583, granted February 26, 1918, upon the application of John W. Cosgrove, of Medford, and Edward Erickson, of Beverly, Massachusetts, for an improvement in "Shoe-Turning Machines," errors appear in the printed specification requiring correction as follows: Page 9, line 11, claim 23, for the word "member" read *members;* same page, line 57, claim 27, for the word "in" read *to;* and that the said Letters Patent should be read with these corrections therein that the same may conform to the record of the case in the Patent Office.

Signed and sealed this 23d day of April, A. D., 1918.

[SEAL.]

F. W. H. CLAY,
*Acting Commissioner of Patents.*

Cl. 12—57.